(12) United States Patent
Legallais et al.

(10) Patent No.: US 9,596,505 B2
(45) Date of Patent: Mar. 14, 2017

(54) DEVICE AND METHOD FOR SYNCHRONIZING AN INTERACTIVE MARK TO STREAMING CONTENT

(75) Inventors: Yvon Legallais, Rennes (FR); Sstéphane Gouache, Rennes (FR); Guillaume Bichot, La Chapelle Chaussee (FR); Anthony Laurent, Vignoc (FR)

(73) Assignee: THOMSON LICENSING, Issy les Moulineaux (FR)

( * ) Notice: Subject to any disclaimer, the term of this patent is extended or adjusted under 35 U.S.C. 154(b) by 1074 days.

(21) Appl. No.: 12/736,873

(22) PCT Filed: May 14, 2009

(86) PCT No.: PCT/EP2009/055880
§ 371 (c)(1),
(2), (4) Date: Nov. 18, 2010

(87) PCT Pub. No.: WO2009/141271
PCT Pub. Date: Nov. 26, 2009

(65) Prior Publication Data
US 2011/0063502 A1    Mar. 17, 2011

(30) Foreign Application Priority Data

May 19, 2008 (EP) .................................. 08305178

(51) Int. Cl.
*H04N 7/08*   (2006.01)
*H04N 21/435* (2011.01)
(Continued)

(52) U.S. Cl.
CPC ....... *H04N 21/435* (2013.01); *G11B 27/3027* (2013.01); *H04N 21/235* (2013.01);
(Continued)

(58) Field of Classification Search
CPC ........... H04N 21/23439; H04N 21/235; H04N 21/435; H04N 21/6437; H04N 21/8455;
(Continued)

(56) References Cited

U.S. PATENT DOCUMENTS 7,787,624 B2   8/2010   Nicolai
7,954,056 B2 * 5/2011   Graham ........................ 715/716
(Continued)

FOREIGN PATENT DOCUMENTS

EP   0812112    12/1997
EP   1826930    8/2007
(Continued)

OTHER PUBLICATIONS

Crinon et al., "Data Broadcasting and Interactive Television", Proceedings of the IEEE, vol. 94, No. 1, Jan. 2006, pp. 102-118.
(Continued)

*Primary Examiner* — Rong Le
(74) *Attorney, Agent, or Firm* — Tutunjian & Bitetto (57) ABSTRACT

The present invention concerns a device and a method for inserting an interactive mark in a streaming content, said method comprising the steps of receiving a streaming content in a first format, receiving the same streaming content in a second format, receiving an interactive mark, corresponding to a first frame of said content in a first format and sending said interactive mark synchronized to a second frame of the content received in the second format, the content in said second frame corresponding to the content in said first frame.

9 Claims, 4 Drawing Sheets

(51) Int. Cl.
  *G11B 27/30* (2006.01)
  *H04N 21/2343* (2011.01)
  *H04N 21/235* (2011.01)
  *H04N 21/6437* (2011.01)
  *H04N 21/845* (2011.01)
  *H04N 21/8545* (2011.01)
  *H04N 21/8547* (2011.01)
  *H04N 21/858* (2011.01)

(52) U.S. Cl.
  CPC ... *H04N 21/23439* (2013.01); *H04N 21/6437* (2013.01); *H04N 21/8455* (2013.01); *H04N 21/858* (2013.01); *H04N 21/8545* (2013.01); *H04N 21/8547* (2013.01)

(58) Field of Classification Search
  CPC ........... H04N 21/8545; H04N 21/8547; H04N 21/858
  See application file for complete search history.

(56) References Cited

U.S. PATENT DOCUMENTS

| | | | |
|---|---|---|---|
| 2002/0083091 A1* | 6/2002 | Pulier et al. | 707/501.1 |
| 2002/0107940 A1 | 8/2002 | Brassil | |
| 2003/0185245 A1 | 10/2003 | Kang et al. | |
| 2003/0208768 A1 | 11/2003 | Urdang et al. | |
| 2003/0214982 A1 | 11/2003 | Lorek et al. | |
| 2004/0141504 A1 | 7/2004 | Blanc et al. | |
| 2005/0275752 A1 | 12/2005 | Li et al. | |
| 2005/0281246 A1 | 12/2005 | Seo et al. | |
| 2007/0064813 A1 | 3/2007 | Fanfelle | |
| 2007/0110107 A1* | 5/2007 | Tighe et al. | 370/503 |
| 2008/0090513 A1* | 4/2008 | Collins et al. | 455/3.01 |

FOREIGN PATENT DOCUMENTS

| | | |
|---|---|---|
| EP | 1855402 | 11/2007 |
| EP | 1954054 | 8/2008 |
| FR | 2857813 | 1/2005 |
| GB | 2419975 | 5/2006 |
| JP | H11146362 | 5/1999 |
| JP | 2001320413 | 11/2001 |
| JP | 2005012361 | 1/2005 |
| JP | 2005159743 | 6/2005 |
| JP | 2006279294 | 10/2006 |
| KR | 20050001242 | 1/2005 |
| KR | 20050052531 | 6/2005 |
| WO | WO03014949 | 2/2003 |
| WO | WO2004093459 | 10/2004 |
| WO | WO2004102571 | 11/2004 |
| WO | WO2005057931 | 6/2005 |
| WO | WO2006129236 | 12/2006 |
| WO | WO2007050259 | 5/2007 |

OTHER PUBLICATIONS

Search Report Dated Sep. 4, 2009.
Li et al., "Research of Transmission and Control of Real-time MPEG-4 Video Streaming for Muliti-channel Over Wireless QoS Mechanism", First International Multi-Symposiums on Computer and Computational Sciences, Hangzhou, China, Jun. 20, 2006, pp. 1-5.
Pal et al., "Video Rate Adaptation and Scheduling in Multi-Rate Wireless Networks", 6th International IFIP-TC6 Networking Conference, Atlanta, Georgia, USA, May 14, 2007, pp. 1-12.
Schulzrinne et al., "RTP: A Transport Protocol for Real-Time Applications", Network Working Group Request for Comments: 3550, Jul. 2003, pp. 1-92.
Wenger et al., "RTP Payload Format for H.264 Video", Network Working Group Request for Comments: 3984, Feb. 2005, pp. 1-83.
Handley et al., "SDP: Session Description Protocol", Network Working Group Request for Comments: 4566, Jul. 2006, pp. 1-49.

* cited by examiner

DEVICE AND METHOD FOR SYNCHRONIZING AN INTERACTIVE MARK TO STREAMING CONTENT

This application claims the benefit, under 35 U.S.C. §365 of International Application PCT/EP09/055880, filed May 14, 2009, which was published in accordance with PCT Article 21(2) on Nov. 26, 2009 in English and which claims the benefit of European patent application No. 08305178.9, filed on May 19, 2008.

FIELD OF THE INVENTION

The present invention relates generally to streaming content and in particular to the transport of interactive mark synchronized to streaming content.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Interactive service mechanism provides synchronization between a video program and an application a user can interact with, in order to provide added or interactive services to the user. Examples of interactive service are voting applications, interactive games, getting information about a product, product ordering. The video program may be live, streamed out from a camera to a broadcaster and ultimately to a terminal, or pre-recorded and streamed from a server to a terminal. It may also be played locally in the terminal from a file. An interactive service may require to be synchronized with a video program. Synchronization information is managed and sent from the network side and retrieved by the terminal. This permits to know when to activate the associated interactive application or part of an interactive application called interactive object.

An interactive object is a piece of software (executable by a processor or interpretable by a virtual machine) as for instance a so called applet or script that uses a Man to Machine Interface to provide the terminal's user the ability to interact with video programs the user is currently watching. In video distribution systems, interactive content is generally transmitted using end-to-end solutions, from the content provider, through the broadcaster up to the terminal. The content provider and the broadcaster sometime form only one entity.

The European patent application 07300769.2 from Thomson Licensing describes the transmission of interactive content under the form of synchronization marks using RTP timestamp.

The insertion of an interactive content is not necessarily performed at the video encoder. The interactive content is then not accurately synchronized to the video content at the output of the video encoder.

SUMMARY OF THE INVENTION

The present invention attempts to remedy at least some of the concerns connected with synchronization in the prior art.

To this end, the invention relates to a method for inserting an interactive mark in a streaming content, the method comprising the steps of receiving a streaming content in a first form, receiving the same streaming content in a second form, receiving an interactive mark corresponding to a first frame of the content in a first form and sending the interactive mark synchronized to a second frame of the content received in the second form, the content in the second frame corresponding to the content in the first frame.

According to an embodiment, the method comprises the step of computing a delay between the reception of a first frame of the streaming content in the first form, and the reception of a second frame of the streaming content in the second form, the content in the second frame corresponding to the content in the first frame.

According to an embodiment, the step of computing is performed once at the beginning of the reception of the first and second content or repeatedly.

According to an embodiment, the interactive mark is appended to the second frame.

According to an embodiment, the interactive mark is sent in a packet different from the second frame.

According to an embodiment, the first form is an uncompressed form, and the second form is a compressed form.

According to an embodiment, the content is a video content.

According to an embodiment, the compressed content comprises a RTP timestamp and the interactive mark is synchronized to the RTP timestamp.

Another object of the invention is a device comprising communicating means for receiving streaming content in a first form, receiving the same streaming content in a second form and sending the streaming content in a third form, and marking means for, on reception of an interactive mark corresponding to a first frame of the content in a first form, sending the interactive mark synchronized to a second frame of the content received in the second form, the content in the second frame corresponding to the content in the first frame.

According to an embodiment, the device comprises calibrating means for computing a delay between a reception of a first frame of the streaming content in the first form, and a reception of a second frame of the streaming content in the second form, the content in the second frame corresponding to the content in the first frame.

According to an embodiment, the first form is an uncompressed form, and the second form is a compressed form.

Another object of the invention is a computer program product comprising program code instructions for executing the steps of the method according to the invention, when that program is executed on a computer. By "computer program product", it is meant a computer program support, which may consist not only in a storing space containing the program, such as a diskette or a cassette, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which.

Figure 1:
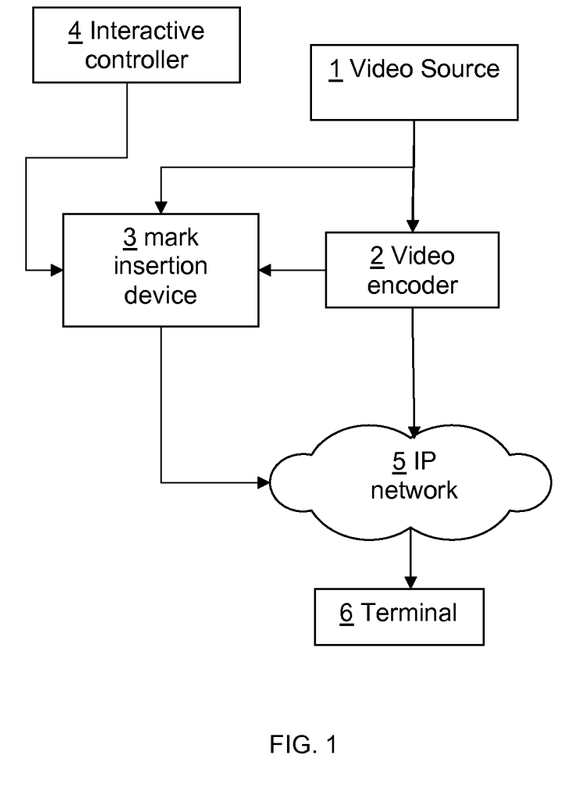
FIG. 1 is a block diagram of a system compliant with the embodiment.
Figure 2:
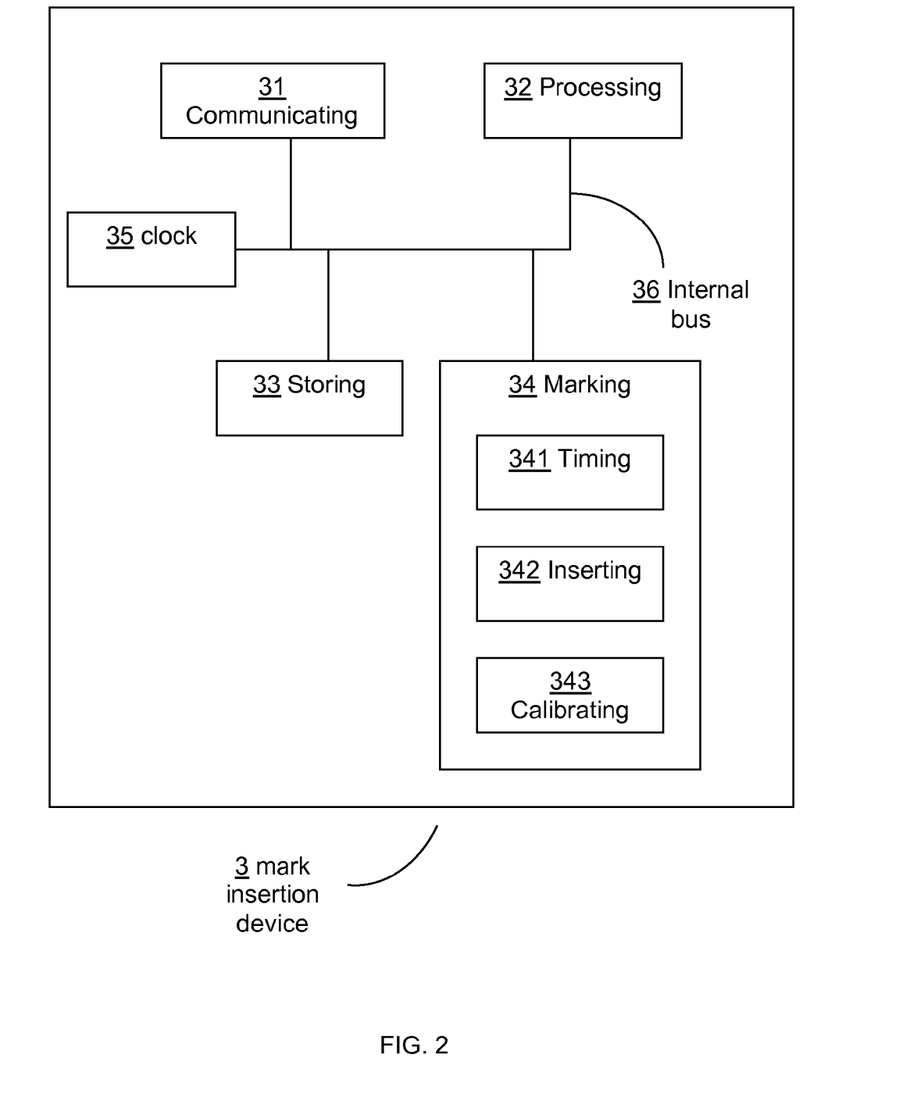
FIG. 2 is a block diagram of an object compliant with the embodiment.
Figure 3:
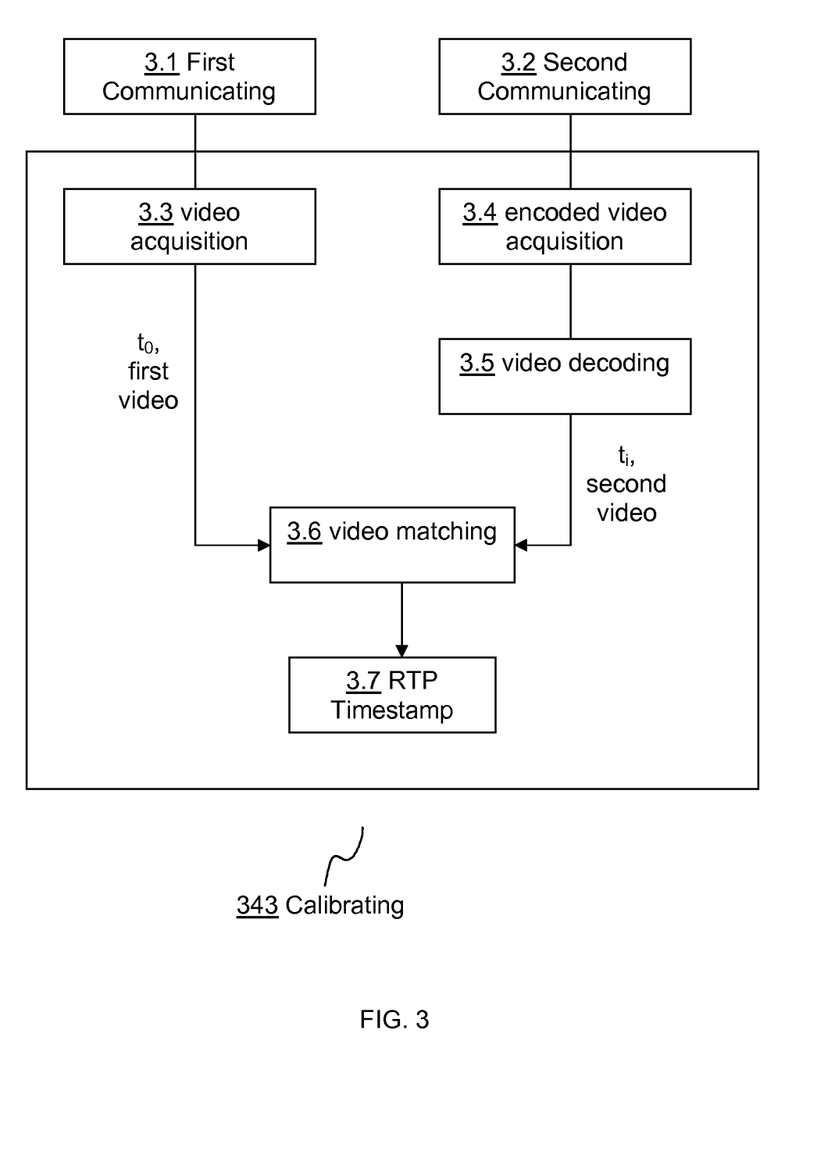
FIG. 3 is a block diagram of a module compliant with the embodiment.

In FIGS. 1 to 3, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

The exemplary embodiment comes within the framework of the transport of compressed video with RTP, but the invention is not limited to this particular environment and may be applied within other frameworks where streaming content is successively transported in an uncompressed and a compressed manner.

A system according to the embodiment is represented in FIG. 1. Only one terminal is represented, but it is obvious that more than one terminal could be present in the system. A video source 1 is a server or any other video program source. It broadcasts the video program into an uncompressed format. The video program is received by a video encoder 2 and a mark insertion device 3, noted MID hereinafter. The video program comprises audio-video content and may comprise interactive content such as Teletext or closed caption.

The video encoder 2 compresses the uncompressed video into compressed streams that are then sent using RTP/RTCP. The video is for example encoded according to the UIT-T H.264 standard. The RTP streams are then delivered to a terminal 6 over an IP network 5. The IP network may be any IP network supporting multicast transmission, such as the Internet.

The MID also receives the compressed streaming content from the encoder. The MID is adapted to insert marks into the program. An interactive controller 4 is adapted to provide to the MID the interactive mark to insert into the content when appropriate. The interactive controller comprises a monitor that allows an operator to watch the video program that is broadcasted. An authoring tool at the interactive controller provides the means to generate the interactive sequences in advance and to deliver them to the MID that then forwards them to the terminal through a dedicated channel or embedded in the associated media stream. Of course the interactive controller and the MID could be collocated in the same device.

For instance, when a goal is marked during a soccer match, by pressing a button, the operator launches the generation of a mark indicating to the terminal to execute a pre-loaded application. This application can be, for example, an invitation to vote for the best player of the soccer match. The MID takes as an entry a reference to the object to activate, like a URI or an identifier easily interpretable by the terminals. This mark is then used as an enabler by the terminal in order to launch an action at a specific time in accordance with the video rendering.

The mark can be either embedded into a video RTP packet using a header extension, or be a RTP packet on its own sent on a dedicated mark stream and synchronized with the video stream. The rendering time of the video is based on RTP timestamp. This RTP timestamp indicates either the video stream RTP packet where to insert the mark in case of RTP header extension usage for marking. If the mark is sent in a separate mark stream, this video RTP timestamp is translated into an absolute time for generating the corresponding mark stream RTP packet at the right time with the right time stamp that corresponds to this absolute time. The translation of the video RTP timestamps into absolute time is done thanks to RTCP Sender Reports received from the video encoder.

The MID 3 is illustrated in FIG. 2. It comprises a processing module 32, a communicating module 31, a storing module 33 and a marking module 34. An internal bus 36 is adapted to connect the modules to enable transmission of control and data packets and signals between them. The communicating module 31 comprises means for receiving video data from the video source and the video encoder. It comprises means for sending and receiving data with the video encoder and the interactive controller. It also comprises means for sending data to the mobile terminals.

The marking module 34 is intended to provide means for inserting interactive information that corresponds to a video. A timing module 341 is intended to provide the timing when the interactive mark can be inserted into the video frame. An inserting module 342 is intended to insert the mark into the video frame. It generates the mark with information received from the interactive controller. A calibrating module 343 is adapted to perform the calibration of the output time to the input time.

The MID is then adapted to make a correspondence between the time of visualization of a video frame and the RTP timestamp of the packet where this frame is transported at the output of the encoder. More precisely, it makes the correspondence between the time when an operator generates an interactive mark corresponding to a video program it watches on a display, and the time when en encoded frame corresponding to that video program is outputted by the MID.

The calibrating module 343 is further illustrated in FIG. 3. A first communication module 3.1 and a second communication module 3.2 are part of a communication module 31 of the FIG. 2. The first communication module receives the uncompressed video from the video source 1. The second communication module receives compressed video from the video encoder 2. The calibrating module comprises a video acquisition module 3.3 that receives the uncompressed video, the first video, from the first communication module 3.1. A video frame is captured together with the value $t_0$ of the MID clock. $t_0$ is the value of the time when the video frame is captured at the MID, where the time corresponds to the value of the clock at the MID. The video acquisition module 3.3 sends the first video frame to a video matching module 3.6.

An encoded video acquisition module 3.4 receives the compressed video from the second communication module 3.2. It sends the compressed video to a video decoding module 3.5 that decodes the video frames frame_i and also gets the value of the RTP timestamp $RTP_i$ and the corresponding encoder's clock value $t_{Vi}$, both these values being computed thanks to the RTCP sender reports generated by the encoder 2.

The format and size of the first video and the second video after decoding are the same. For instance, the format of the first video is YUV 420 format. Then, the RTP stream captured on the second interface that is an Ethernet interface receiving RTP packets from the encoder is decoded into raw YUV420 video frames by the video decoding module 3.5. Then it sends the decoded video frames, also called the second video frames, to the video matching module. It sends each frame_i with the corresponding $RTP_{Vi}$, and the $t_{Vi}$. All $t_{Vi}$ values are computed with the help of the RTCP sender reports accompanying the RTP video stream by using the following equation:

$$t_{Vi} = t_{RTCP} + \frac{(RTP_{Vi} - RTP_{RTCP})}{VideoTimescale}$$

Where:
$t_{RTCP}$ is the time value given in the RTCP sender report;
$RTP_{RTCP}$ is the RTP timestamp corresponding to $t_{RTCP}$ given in the RTCP sender report;
$RTP_{Vi}$ is the RTP timestamp of the frame_i;
Video Timescale corresponds to the frame emission frequency of the video encoder, in RTP timestamp per second.

The VideoTimescale permits to provide the correspondence between the reference time scale and the RTP timestamp. The VideoTimescale corresponds to the frame emission frequency of the video encoder. It is provided by the encoder to the receivers through SDP announcements (RFC 4566). This RFC specifies that the description of a medium (video, audio or other) broadcast over RTP contains an attribute called "rtpmap" defining the "clock rate" field. The encoder also distributes the audio timescale.

The calibration is then performed at the video matching module. The pixels of each of the second frames are compared with those of the first frame using the following formula, where MSE is the mean squared error.

$$MSE = \frac{\sum_{i=0}^{M}\sum_{j=0}^{N}[f(i,j) - F(i,j)]^2}{m \cdot n}$$

Where
M is the width of the decoded frame, in term of number of pixels
N is the height of the decoded frame in term of number of pixels
f(i, j) is the pixel (i, j) of the second frame
F(i, j) is the pixel (i, j) of the first frame
The computation is performed only over the Y (luma) plane of the frame, the U and V (chroma) planes are ignored. Alternatively the computation is performed on all the planes of the frame, by computing plane by plane, and averaging the results with for instance the following weightings: 4 for Y, 1 for U and 1 for V.

Then the video matching module computes the peak signal to noise ratio (PSNR) in decibels (dB). It uses the root mean squared error (RMSE) which is the square root of MSE, according to the following formula:

$$PSNR = 20\log_{10}\left(\frac{255}{RMSE}\right)$$

The highest value of PSNR is then selected. It corresponds to the frame_i that better matches the input frame. The video matching module gets the clock value $t_{Vi}$ and $RTP_{Vi}$ value of that frame_i. That $RTP_{Vi}$ value is the value of the RTP frame that better matches the first frame received at $t_0$. It is named $RTP_{V0}$ and corresponds to a timestamp value $RTP_0$ in the RTP interactive stream timeline referential.

At this point a relationship between the time at the input of the encoder and the RTP timeline is established. The calibration is done. This information is then used at the mark insertion as described hereinafter.

When an operator performs a mark insertion at the time of the reception of the first frame received at the time $t_i$, the mark is attached to a frame sent with the RTP timestamp value $RTP_i$ that corresponds to:

$$RTP_i = RTP_0 + (t_i - t_0 - \Delta_d) \cdot InteractiveTimescale$$

Where:
$\Delta_d$ is a constant delay value that is introduced by the display chain. That is a fixed value that is set at the MID.
Interactive timescale corresponds to the Interactive Trigger emission frequency of the MID (in RTP timestamp per second).

The interactive timescale is distributed by the MID to the receivers. The MID intercepts the SDP files and inserts the interactive timescale parameter. It then sends the modified SDP file to the receivers.

More generally, the SDP files could be built at a device other than the decoder and the MID. That device would then build the complete SDP file from information received from the encoder and the MID.

According to the embodiment, the mark is part of a dedicated RTP stream, called a mark stream. The mark stream is sent to the terminal 6 over the IP network, as indicated in FIG. 1. Of course, the mark could be inserted into the video RTP stream itself. In this case, the MID is at the output of the encoder and acts as a proxy so as to filter out the incoming RTP packets in which RTP header extension is added. The encoder does not send the RTP packets directly to the IP network, but sends them to the MID. If marks are inserted into the video RTP stream itself, $RTP_{V0}$ and $RTP_0$ are the same and InteractiveTimescale is equal to VideoTimescale.

According to the embodiment, the encoder's clock and the MID's clock are synchronized. The Network Time Protocol (NTP) is used to set the clocks to the same value; the encoder and the MID use the same NTP server. The correspondence between RTP timestamps is then computed once for all.

Alternatively, the MID computes a drift compensation factor C to adjust the RTP prediction. This factor is obtained by capturing the RTP packets at the output of the encoder. Using the data points defined as (capture time; RTP timestamp), with b being the slope of the linear regression line through these data points, C is set to the value: C=b/VideoTimescale. The RTP prediction formula is then:

$$RTP_i = RTP_0 + (t_i - t_0 - \Delta_d) \cdot C \cdot VideoTimescale$$

Figure 4:
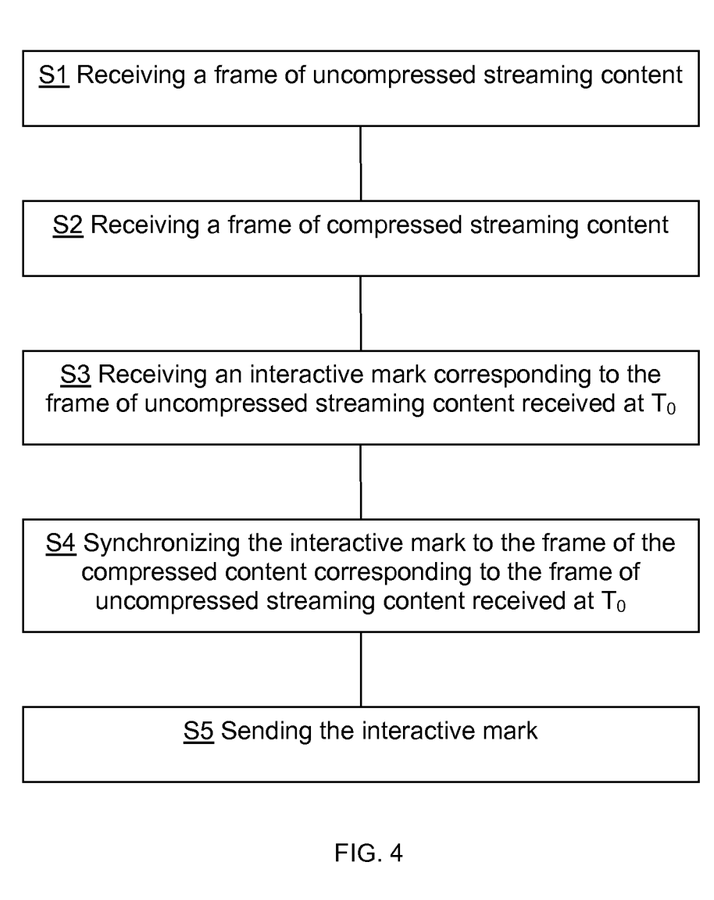
FIG. 4 is a flow chart illustrating a mark insertion method according to the embodiment.

The mark insertion method as described hereinabove is illustrated in FIG. 4.

At step S1, the MID receives a frame of uncompressed streaming content.

At step S2, the MID receives a frame of compressed streaming content. This is the same streaming content as the one received in uncompressed form.

At step S3, the MID receives an interactive mark corresponding to the frame of uncompressed streaming content received at $t_0$. The MID is adapted to insert the interactive mark in the streaming content. In particular it sends the interactive mark in the compressed streaming content.

At step S4, the MID synchronizes the interactive mark to the frame of the compressed content corresponding to the frame of uncompressed streaming content received at $t_0$. At step S5, the MID sends the interactive mark.

The embodiment has been described for a video stream. It is of course applicable to an audio stream. In that case, the system contains audio encoder and decoder instead of the video encoder and decoder. The calibration is performed between the input and the output at the MID. The uncompressed audio and the encoded audio are captured at the input and at the output of the MID, during a period long enough; around ten seconds for the input signal and one minute for the output signal.

The audio sampling rate is not the same for the uncompressed audio and the encoded audio. The sampling parameters are made available through the SDP signaling. This permits the MID to perform a sampling rate conversion well known per se and if necessary a modification of the number of channels, such as averaging the right and left channels to get a single mono channel.

The correlation between the converted signal at the input and the output signal is estimated as follows, where $f_n$ and $g_n$ are discrete functions:

$$(f*g)[n] = \sum_j f[j]g[n+j]$$

The value of that f*g function is high when the correlation between the functions f and g is high. The gap between the input signal and the output signal is the $n_{max}$ value that corresponds to the highest correlation.

Then the RTP value is:

$$RTP_0 = RTP_{capture} + n_{max} \cdot \text{AudioTimescale}$$

And the RTP timestamp can be predicted as:

$$RTP_i = RTP_0 + (t_i - t_0) \cdot \text{AudioTimescale}$$

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method, at a mark insertion device, for inserting an interactive mark in a streaming content, said method comprising, at said device, the steps of:
   receiving a streaming content in an uncompressed format from a first source device;
   receiving said streaming content in a compressed format from a second device and transported over RTP;
   receiving from a third device an interactive mark corresponding to a first frame of said streaming content in the uncompressed format;
   identifying a second frame of said streaming content in the compressed format, said second frame being the one which content corresponds to the content in said first frame; and
   sending said interactive mark in an RTP packet having a timestamp that corresponds to the one of said second frame.

2. The method according to claim 1, wherein said interactive mark is appended to said second frame.

3. The method according to claim 1, wherein said interactive mark is sent in a RTP packet different from said second frame.

4. The method according to claim 1, wherein said content is a video content.

5. A device comprising:
   a communicating module configured to receive streaming content from a first device in an uncompressed format, receive said streaming content from a second device in a compressed format and transported over RTP and send said streaming content in a compressed format, and
   a marking module configured to, on reception of an interactive mark from a third device corresponding to a first frame of said streaming content in the uncompressed format, identify a second frame of said streaming content in the compressed format, said second frame being the one which content corresponds to the content in said first frame, and send said interactive mark in an RTP packet having a timestamp that corresponds to the one of said second frame.

6. A computer device comprising:
   a non-transitory memory; and
   a processor configured to execute the steps of the method according to claim 1.

7. The device according to claim 5, wherein said interactive mark is appended to said second frame.

8. The device according to claim 5, wherein said interactive mark is sent in an RTP packet different from said second frame.

9. The device according to claim 5, wherein said content is a video content.

* * * * *

UNITED STATES PATENT AND TRADEMARK OFFICE
CERTIFICATE OF CORRECTION

| | |
|---|---|
| PATENT NO. | : 9,596,505 B2 |
| APPLICATION NO. | : 12/736873 |
| DATED | : March 14, 2017 |
| INVENTOR(S) | : Yvon Legallais et al. |

It is certified that error appears in the above-identified patent and that said Letters Patent is hereby corrected as shown below:

Second name of the Inventor under (75) Inventors should read "Stéphane"

Signed and Sealed this
Ninth Day of May, 2017

Michelle K. Lee
*Director of the United States Patent and Trademark Office*